United States Patent
Døssing et al.

(10) Patent No.: US 9,366,447 B2
(45) Date of Patent: Jun. 14, 2016

(54) SERVICE WATER HEATING UNIT

(75) Inventors: Bent Døssing, Silkeborg (DK); Olav Jensen, Viborg (DK)

(73) Assignee: Grundfos Management a/s, Bjerringbro (DK)

( * ) Notice: Subject to any disclaimer, the term of this patent is extended or adjusted under 35 U.S.C. 154(b) by 760 days.

(21) Appl. No.: 13/193,815

(22) Filed: Jul. 29, 2011

(65) Prior Publication Data

US 2012/0024496 A1  Feb. 2, 2012

(30) Foreign Application Priority Data

Jul. 30, 2010 (EP) ..................................... 10007975

(51) Int. Cl.
| | | |
|---|---|---|
| B60H 1/00 | (2006.01) | |
| G05D 23/00 | (2006.01) | |
| F24D 3/10 | (2006.01) | |
| F24H 9/14 | (2006.01) | |
| F28D 7/00 | (2006.01) | |
| F28D 9/00 | (2006.01) | |
| F28D 20/00 | (2006.01) | |
| F28F 27/00 | (2006.01) | |

(52) U.S. Cl.
CPC .. *F24D 3/10* (2013.01); *F24H 9/14* (2013.01); *F24H 9/142* (2013.01); *F24H 9/148* (2013.01); *F28D 7/0075* (2013.01); *F28D 9/0093* (2013.01); *F28D 20/0034* (2013.01); *F28F 27/00* (2013.01); *F28D 2020/0078* (2013.01); *Y02E 60/142* (2013.01)

(58) Field of Classification Search
CPC ............. F24D 3/10; F24H 9/14; F24H 9/142; F24H 9/148; F28D 9/0093; F28D 20/0034; F28D 2020/0078; F28F 27/00
USPC ............ 165/11.1, 296, 96, 97, 101, 159, 164, 165/902; 237/8 R, 8 A; 122/13.01, 13.3, 122/14.3, 35
See application file for complete search history.

(56) References Cited

FOREIGN PATENT DOCUMENTS

| | | |
|---|---|---|
| CH | 278109 A | 9/1951 |
| DE | 202007003454 U1 | 6/2007 |
| EP | 0453080 A1 | 10/1991 |
| EP | 2093517 A1 | 8/2009 |
| WO | 2006059208 A1 | 6/2006 |

OTHER PUBLICATIONS

EP Search Report issued Mar. 16, 2011 in EP Application No. 10007975.5.
Chinese Office Action Issued Jul. 16, 2014.

*Primary Examiner* — Travis Ruby
(74) *Attorney, Agent, or Firm* — Panitch Schwarze Belisario & Nadel LLP

(57) ABSTRACT

A service water heating unit (2), provided for use in a heating installation, includes at least one heat exchanger (6), defining a first flow path (10) for a heating medium and a second flow path (12) for service water to be heated. The two flow paths (10, 12) are guided relative to one another in a first portion (A) in a countercurrent arrangement with directions of flow oriented in opposite directions, and in a second portion (B) connecting downstream, viewed in the direction of flow of the service water, in a co-current arrangement with directions of flow oriented in the same direction.

8 Claims, 15 Drawing Sheets

SERVICE WATER HEATING UNIT

CROSS REFERENCE TO RELATED APPLICATION

The present application claims priority to European Patent Application No. 10 007 975.5, filed Jul. 30, 2010.

BACKGROUND OF THE INVENTION

The invention relates to a service water heating unit according to the preamble of claim 1.

Service water heating units of this type are used in heating installations to heat service water which is then supplied, for example, to wash basins, showers and bathtubs as hot water. For example, the heating may take place in a service water storage container or else via a heat exchanger. Such a heat exchanger comprises two flow paths: one for the heating medium, i.e. normally the water which is heated by the heating boiler and flows through the heating installation, and a second flow path through which the service water to be heated is conveyed.

Known heat exchangers have either a co-current arrangement, in which the flow paths for the service water and the heating medium are oriented in the same direction, or else a countercurrent arrangement, in which the directions of flow of heating medium and service water are oriented in opposite directions. With the co-current arrangement there is the drawback that the outlet side for the heating medium and the service water are located at the same end of the heat exchanger and therefore the maximum temperature for the service water to be heated can, at most, correspond to the outlet temperature of the cooled heating medium from the heat exchanger. In practice, the temperature will lie below this. This means, very high temperatures of the heating medium on the inlet side of the heat exchanger are necessary in order to achieve high service water temperatures. With the countercurrent arrangement higher outlet temperatures for the service water can be reached since the outlet of the heated service water and the inlet of the heating medium are located on the same side of the heat exchanger. This means, the service water is heated in the heat exchanger by the incoming heating medium, i.e. the as yet uncooled heating medium, in the vicinity of the outlet side. However, this arrangement in turn poses the drawback that, in particular with low service water volume flow rates, the outlet temperature of the service water may be too high. In addition to a risk of scalding, an excessively high service water temperature also poses the drawback that it may lead to increased limescale in pipes and fittings.

In view of this problem, the object of the invention is to provide an improved service water heating unit which ensures a sufficient heating of the service water, but can also reliably prevent excessively high temperatures of the service water.

This object is achieved by a service water heating unit having the features disclosed in claim 1. Preferred embodiments will emerge from the dependent claims, the description below and the accompanying drawings.

SUMMARY OF THE INVENTION

The service water heating unit according to the invention is provided for use in a heating installation, i.e. in particular on or in a heat exchanger or a heat accumulator. For example, such a heat exchanger can be mounted on a heating boiler or a store for heated heating medium. Such a service water heating unit can include all essential components necessary for service water heating and can thus form a prefabricated unit which can then be easily integrated into a heating installation or a building. Merely connections from the service water heating unit to the heating installation and, if necessary, the pipelines of the building then also have to be produced. In particular, such a service water heating unit contains a heat exchanger having the necessary connection points and a circulating pump for conveying heating medium to the heat exchanger. Furthermore, sensors, any valves which are necessary and, in particular, a control device for controlling the service water heating can also be integrated into the service water heating unit so that it ideally only has to be connected to the external pipelines and to a power supply via its line connections. The line connections contain, in particular, an inlet and outlet for heating medium, an inlet and outlet for service water to be heated, and optionally a connection for a service water circulation line.

The service water heating unit comprises at least one heat exchanger, in which are formed a first flow path for a heating medium, for example water, and a second flow path for the service water to be heated. The two flow paths are separated from one another hydraulically, but are guided towards one another in the heat exchanger in a known manner and in such a way that maximum heat transfer from the first flow path to the second flow path is possible in order to heat the service water in the second flow path using the hot heating medium.

In accordance with the invention, the flow paths are to be arranged relative to one another in a combination of co-current and countercurrent flow in order to overcome the drawbacks of known heat exchangers in these service water heating units. For this purpose the two flow paths are guided in a first portion, viewed in the direction of flow of the service water, in a countercurrent arrangement. This means in this portion the heating medium flows through the heat exchanger in the first flow path and the service water to be heated flows through the heat exchanger in the second flow path in opposite directions. That is to say, the outlet for the cooled heating medium is located on the inlet side of the cold service water, i.e. the service water to be heated. This means the incoming cold service water is first heated by the heating medium, which has already been cooled, and as a result of the countercurrent passes, over the course of its flow through the heat exchanger, into hotter regions of the heat exchanger, in which the heating medium flowing in the opposite direction is also hotter.

In a second portion of the heat exchanger connected downstream, viewed in the direction of flow of the service water, the relative arrangement of the two flow paths to one another changes from the countercurrent arrangement to the co-current arrangement, i.e. the flows through the flow paths run in the same direction. This means as the flow continues further in the second flow path for the heated service water, said water first passes into the region of the incoming heating medium, i.e. into the region of greatest temperature of the heating medium, and then flows in the same direction so the outlet of the second flow path from the heat exchanger lies in a region of the first flow path which is spaced from the inlet of the first flow path and therefore a temperature lower than the inlet temperature of the heating medium is provided here during operation. That is to say, the outlet for the service water is not located in the hottest region of the heat exchanger. As a result of this flow guidance with the reversal from countercurrent to co-current, a greater outlet temperature of the service water can be achieved than is possible with the co-current principle, i.e. in particular the outlet temperature of the service water can be higher than the outlet temperature of the heating medium. At the same time, however, it is possible to prevent an excessively high temperature of the emergent service water since, in contrast to the purely countercurrent principle, the emergent service water can be kept at a temperature level considerably below the temperature level of the incoming heating medium since, towards the outlet end of the second flow path, said path is not guided along directly at the inlet end of the first flow path.

The at least one heat exchanger is preferably a plate heat exchanger. The individual flow paths are separated from one another by plates, preferably made of metal. Such a heat exchanger is thus designed as a stack of plates distanced from one another, wherein the first and second flow paths are formed alternately between the plates. In such a heat exchanger large heat transfer areas are provided over the plates and a cost-effective and compact construction is possible. Furthermore, such a plate heat exchanger forms a solid bearing structure which is adapted for the mounting of further components, such as pumps, distributors, pipelines and valves directly on the plate heat exchanger such that it may constitute a central bearing unit of the service water heating unit.

The first portion of the flow paths, i.e. in which the countercurrent arrangement is provided, preferably accounts for between 50% and 80%, more preferably between 65% and 75% of the length of the second flow path for the service water. The remaining part of the second flow path is thus allocated to the portion in which the co-current arrangement is provided, and optionally to a transition region located between the portions.

The first and second portions of the flow paths of the at least one heat exchanger can be integrated in a single heat exchanger. Alternatively, it is also possible to provide two separate heat exchangers, wherein each heat exchanger comprises a first and a second flow path, the heating medium being guided through the first flow path and the service water being guided through the second flow path. In this case the first and second heat exchangers are interconnected in such a way that the described countercurrent arrangement is selected in the first heat exchanger and the co-current arrangement is selected in the second heat exchanger. This means the change from countercurrent to co-current takes place between the two heat exchangers through the corresponding fluid connection. The heat exchanger arrangement according to the invention can thus be constructed very easily from commercially available components.

A reverse portion is preferably formed in the at least one heat exchanger between the first and second portions, in which reverse portion the first and/or second flow path extend in such a way that a reversal in direction relative to the respective other flow path from countercurrent to co-current is provided. Such a reverse portion may be formed either between two separate heat exchangers by the corresponding fluid connection between the heat exchangers, or else between the two portions in the case of an integrated heat exchanger. In the case of a plate heat exchanger this can be achieved by changing the combination of the clearances between the individual plates inside the plate heat exchanger.

The service water heating unit preferably further comprises, in addition to the at least one heat exchanger, a circulating pump for the heating medium. The circulating pump conveys the heating medium through the heat exchanger. The heat exchanger preferably connects to the pressure side of the pump, so the circulating pump is arranged on the inlet side of the heating medium inlet of the heat exchanger. However, it is also conceivable to arrange the circulating pump on the outlet side of the heating medium outlet of the heat exchanger, such that the suction side of the pump is facing the heat exchanger.

The circulating pump is particularly preferably fastened to the heat exchanger. In particular when designing the heat exchanger as a plate heat exchanger, it may form a bearing structure, as described above. The circulating pump can also be mounted on such a bearing structure formed by the heat exchanger, in particular directly above the pipe sections which connect the circulating pump to the heat exchanger.

In accordance with a further preferred embodiment, the at least one heat exchanger comprises, at least at one inlet or outlet of the first and/or second flow path, a connector for connection to a connection line. This connector thus forms a connection element which forms the connection between the heat exchanger and a connection line for connecting the service water heating unit to a heating installation. For this purpose the connector preferably comprises, internally, at least one flow path or flow duct which is connected at one end to the inlet or outlet of the heat exchanger, the opposite end being provided for connection to the connection line. For this purpose a conventional connection configuration, such as a plug connection, a thread, etc. can be formed at this end, optionally with a seal if required.

More preferably, a temperature and/or flow sensor is arranged in the connector. Such a temperature and/or flow sensor can be used to control and regulate the service water heating unit. In particular, it is preferred to provide a temperature and/or flow sensor in the flow path for the service water to be heated, i.e. on the inlet or outlet side of the second flow path of the heat exchanger, which sensor detects a service water request or a service water demand. In other words, this temperature and/or flow sensor detects a temperature change or flow in the flow path for the service water, which signals a system control that heated service water is requested and so the control can accordingly trigger and control the inflow of heating medium to the heat exchanger to heat the service water. Furthermore, a temperature sensor may also be arranged in the heat exchanger in the flow of the heating medium in the first flow path, i.e. on the inlet or outlet side of the first flow path, so as to detect the temperature of the heating medium, in particular on the outlet side of the heat exchanger. Based on this temperature, the volume flow rate of the heating medium can be adjusted as needed as a function of the heat demand for heating the service water.

A connector of the type described may thus be provided in the heat exchanger, either for connection to the first flow path or for connection to the second flow path. However, a combined connector is also possible which comprises, internally, two flow ducts: one for the service water and one for the heating medium so that both flow paths in the heat exchanger can be connected to external pipelines or component parts using one connector.

A connector according to the description above is preferably connected to the circulating pump for the heating medium. In other words, such a connector can produce the connection between circulating pump and heat exchanger. A flow duct inside the connector preferably forms a fluid connection from the circulating pump to the first flow path inside the heat exchanger. Furthermore, the connector can also produce a mechanical connection between heat exchanger and circulating pump in order to thus fasten the circulating pump to the heat exchanger so that the heat exchanger, as a bearing element, carries the circulating pump.

The service water heating unit described above preferably further comprises fastening elements which are designed for mounting of the service water heating unit on a heating boiler or water store. As a whole, the service water heating unit may thus constitute a module which is connectable to a heating boiler or heat generator or water store. A mechanical connection is created by the fastening elements. The fluid connections are produced by corresponding pipelines, wherein these can produce a mechanical attachment if necessary, either alternatively or additionally. The fastening elements can be formed directly on the heat exchanger as a bearing structure. For example, the fastening elements may be formed as a bearing frame which is fastened to the heat exchanger and, in turn, can be connected to a heating boiler or water store, for example by screwing or by a hook connection. The bearing frame may further be formed in such a way that it simultaneously serves as a handle, or can carry handles which facilitate the handling of the service water heating unit during assembly. Further, such a bearing frame may additionally carry a housing which, in particular, can also provide thermal insulation.

BRIEF DESCRIPTION OF THE SEVERAL VIEWS OF THE DRAWINGS

The invention will be described hereinafter by way of example with reference to the accompanying drawings, in which.

DETAILED DESCRIPTION

Figure 1:
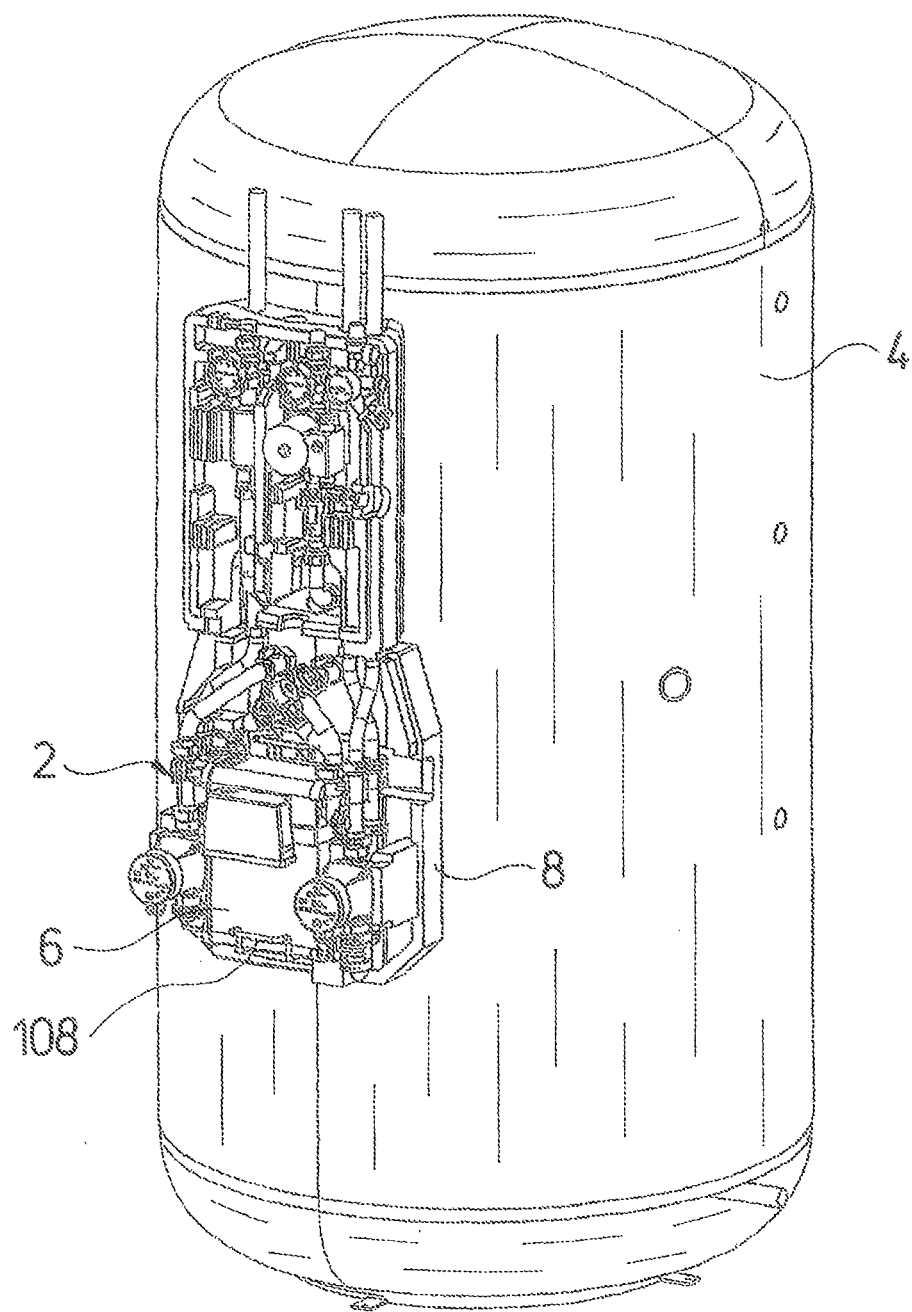
FIG. 1 shows an overall view of a service water heating unit arranged on a heat accumulator.

The heat exchanger unit shown as an example is a service water heating unit 2 and is provided for use in a heating installation. In the example shown here (FIG. 1), the service water heating unit 2 is mounted on a heat accumulator 4, for example a water store, which stores heating water heated by a solar installation. The heat exchanger 6 of the service water heating unit 2 is supplied with heating medium from the heat accumulator 4 to heat service water. In FIG. 1 a housing surrounding the service water heating unit 2 is illustrated in the open position, i.e. the front cover is removed. In the other figures the service water heating unit 2 is illustrated without a surrounding housing.

Figure 9:
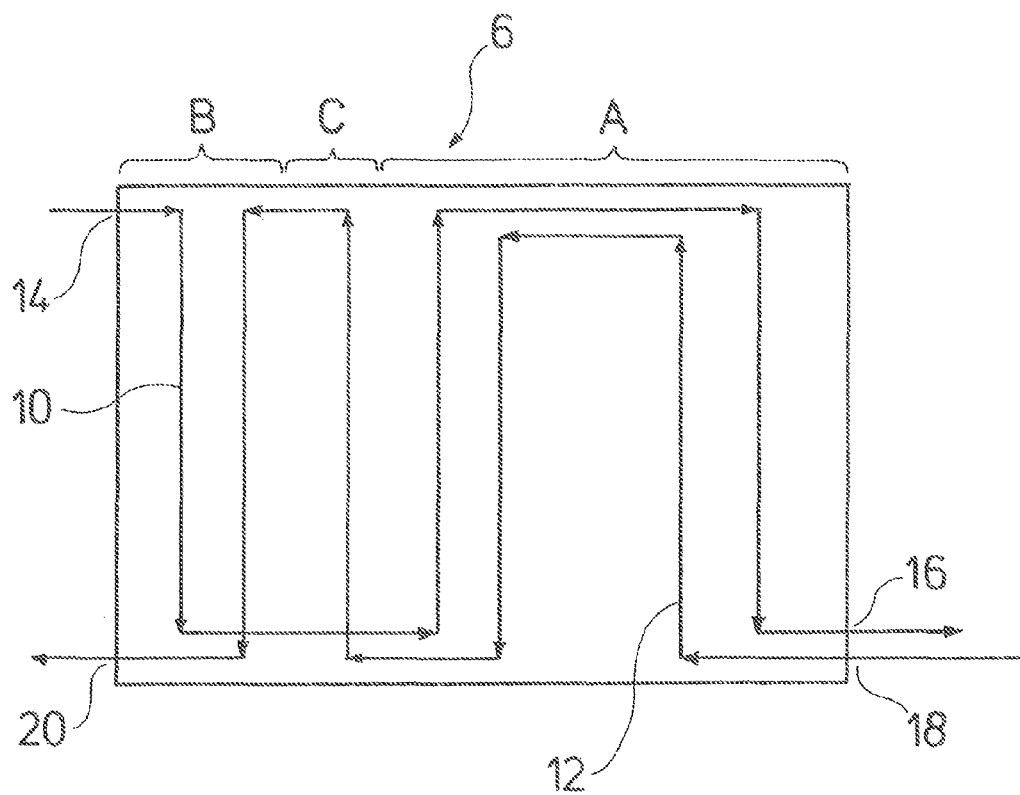
FIG. 9 shows a schematic view of the flow paths inside the heat exchanger according to FIG. 3.

The central component of the heat exchanger unit or service water heating unit 2 is a heat exchanger 6 in the form of a plate heat exchanger. Service water to be heated is heated via the heat exchanger 6 and discharged as heated service water, for example in order to supply tap points 7 of wash basins, showers, bathtubs, etc. in a house with hot service water. The heat exchanger is supplied with heating medium in order to heat the service water. Said heat exchanger is provided, internally, with two flow paths, as illustrated schematically in FIG. 9. A first flow path 10 is the flow path through which the heating medium is guided through the heat exchanger. The second flow path 12 is the flow path through which the service water is conveyed through the heat exchanger. Both flow paths are separated from one another in a manner known per se by plates, via which a heat transfer from the heating medium to the service water is possible.

The two outer plates 13 of the plate stack form two mutually opposed side faces of the heat exchanger 6. The fluid connection points 14 to 20 of the heat exchanger 6 are formed on these side faces and connectors are fastened there, as described below.

The heating medium passes through the inlet 14 into the heat exchanger 6 and exits again through the outlet 16. The service water to be heated enters into the heat exchanger 6 at the inlet 18 and exits again from the heat exchanger at the outlet 20. As is shown schematically in FIG. 9, the heat exchanger is divided into three portions A, B and C. In the direction of flow of the service water through the second flow path 12, portion A forms a first portion in which a majority of an entire length of the first flow path 10 and a majority of an entire length of the second flow path 12 contained within the first portion (A) pass by one another in countercurrent. This means, the service water to be heated and the heating medium flow in opposite directions past the plates of the heat exchanger separating them. The effect of this is that the cold service water, which enters into the heat exchanger 6 at the inlet 18, is first heated by the heating medium, which has already been cooled, emergent at the outlet 16 and then passes in the direction of flow into the vicinity of increasingly hotter heating medium. The heat exchanger 6 comprises a second portion B in which a majority of an entire length of the first flow path 10 and a majority of an entire length of the second flow path 12 contained within the second portion (B) are no longer guided relative to one another in a countercurrent arrangement, but are guided in a co-current arrangement, i.e. the flows in the majority of the entire length of the first flow path 10 and in the majority of the entire length of the second flow path 12 contained within the second portion (B) run parallel in the same direction along the plates separating them or other heat-conducting separation elements separating them.

Figure 10:
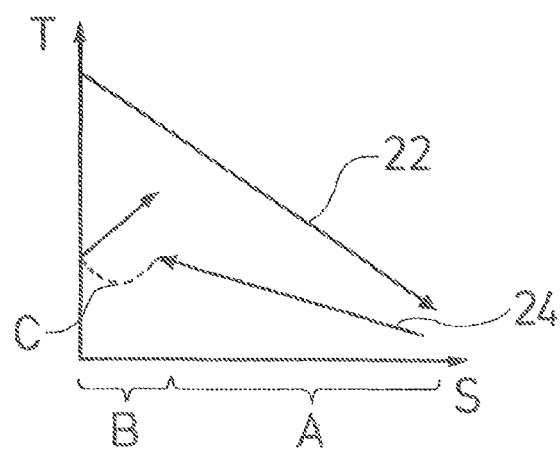
FIG. 10 shows the temperature curve inside the heat exchanger over the flow path.

A reverse portion C is formed between the first portion A and the second portion B, in which reverse portion the relative reversal of the directions of flow in the flow paths to one another is carried out. In the example shown here the portions A, B and C of the heat exchanger are integrated in one heat exchanger. However, it is to be understood that the portions A and B could also be formed in separate heat exchangers and the direction reversal of the flows to one another in portion C could be achieved by a corresponding piping between the two heat exchangers. Owing to the reversal to the co-current principle, the service water is prevented from being overheated since the heated service water emergent at the outlet 20 is not heated in the last portion of its flow path 12 directly by the hot heating medium entering at the inlet 14, but by heating medium which has already been cooled slightly. The maximum service water temperature to be achieved is thus limited. This can be seen in FIG. 10. In the diagram shown in FIG. 10 the temperature T of the heating medium is plotted as a curve 22 over the path S and the temperature T of the service water is plotted as a curve 24 over the path s. It can be seen that the outlet of the service water does not lie in the region of the highest temperature of the incoming heating medium, and in this regard a maximum temperature can be achieved which lies at the level of the temperature of the heating medium in the region of the outlet 20 of the service water from the heat exchanger.

The inlet 14 for the heating medium, the outlet 16 for the heating medium, the inlet 18 for the service water to be heated and the outlet 20 for the heated service water are formed on the plate heat exchanger 6 as fluid connection points, on which connectors are placed in turn and produce the connection to further component parts and pipelines. A first connector 26 is placed on the outlet 20 for the heated service water. This connector comprises a base element 28 which, in an identical configuration in the second connector 30 but merely rotated through 180°, is placed on the fluid connection points of the heat exchanger 6 forming the outlet 16 and the inlet 18. This affords the advantage that the same base element 28 can be used as a first connector and as a second connector and the number of different parts can be reduced.

Figure 4:
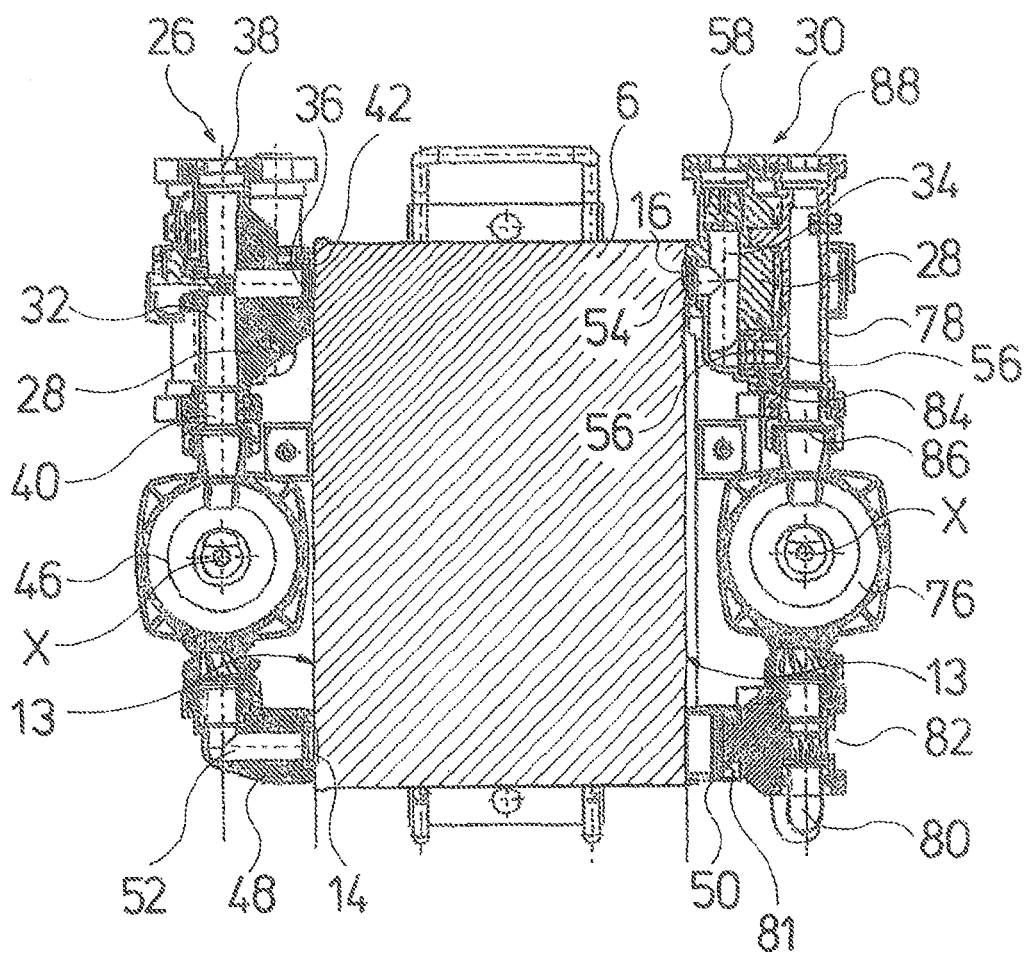
FIG. 4 shows a sectional view of the service water heating unit according to FIG. 2, FIGS. 5 and 6 show a service water heating unit according to FIGS. 1, 2 and 4 without a service water circulation module.

Two separate flow ducts 32 and 34 are formed in the base element 28. The flow duct 32 is T-shaped and opens into three connection openings 36, 38 and 40 (see the sectional view in FIG. 4). When using the base element 28 as a first connector 26, the connection opening 36 is unused and closed by the wall of the heat exchanger 6, a seal 42 for sealing being arranged at the connection opening 38 between the base element 28 and the wall of the heat exchanger 6. The connection opening 38 forms the connection point for connecting to a feed line 44 which is connected to the heat accumulator 4 for supplying hot heating medium. At the connection opening 40 of the flow duct 32 arranged opposite, a first circulating pump 46 is arranged on the base element 28 during use in the first connector 26 and feeds the heating medium to the inlet 14 of the heat exchanger 6. For this purpose a third connector 48 is arranged on the inlet 14 and can be arranged, in an identical configuration but merely rotated through 180°, on the opposite side of the heat exchanger 6, as described below, as a fourth connector 50. This means, the third connector 48 and the fourth connector 50 are also formed at least of an identical base element.

A flow duct 52 is formed in the third connector 48 and connects the pressure connection of the circulating pump 46 to the inlet 14 of the heat exchanger.

As can be seen in the sectional view with reference to the second connector 30, the second flow duct 34 in the base element 28 is likewise T-shaped and comprises three connection openings 54, 56 and 58. The connection opening 58 of the second flow duct 34 is closed in the first connector 26, for example by an inserted stopper. The connection opening 54 is connected to the outlet 20 of the heat exchanger 6, a seal 42 likewise being arranged between the connector 26 and the heat exchanger 6. In the first connector 26 a connection part 60 is placed on the connection opening 56 of the second flow duct 34 and connects the connection opening 58 to the line connection 62 via a flow duct formed inside the connection part 60. The line connection 62 connects to a hot water line, through which the heated service water is removed.

Figure 2:
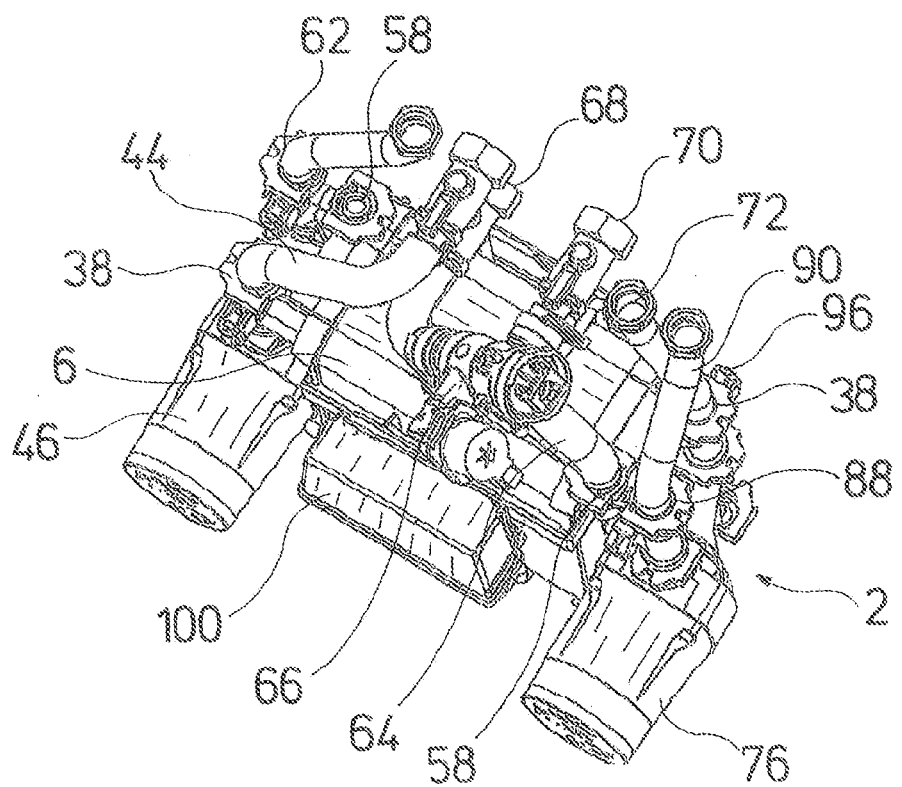
FIG. 2 shows a perspective overall view of the service water heating unit according to FIG. 1.
Figure 3:
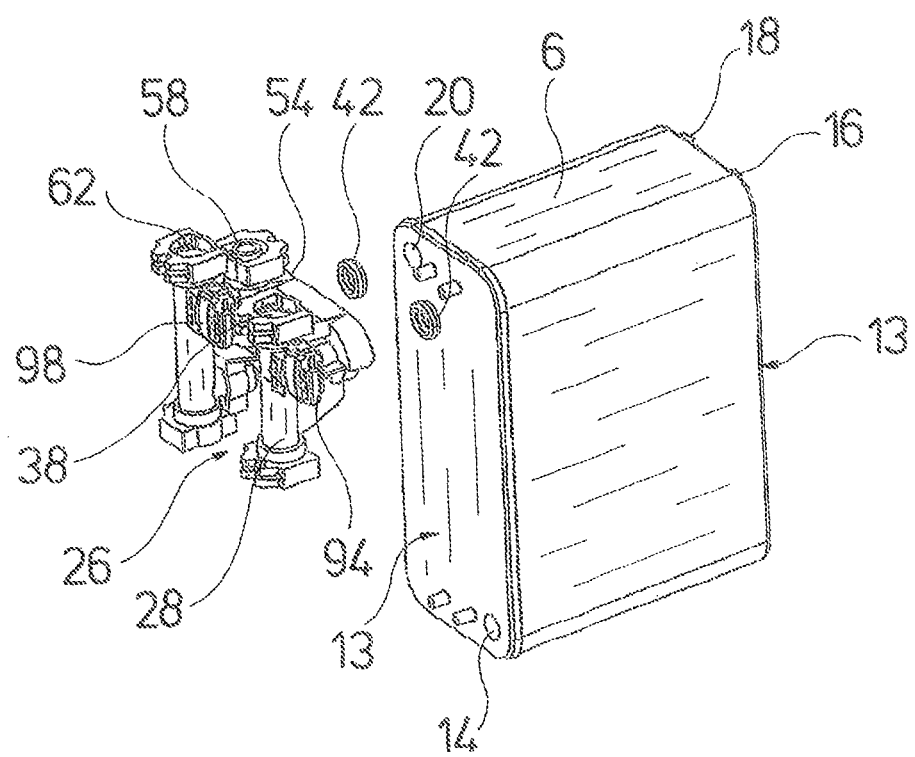
FIG. 3 shows a perspective view of the heat exchanger comprising a connector.

The base element 28 is placed as a second connector 30 on the opposite end face of the plate heat exchanger 6, which forms the bearing structure of the service water heating unit. The outlet 16 for the heating medium and the inlet 18 for the cold service water are connected to the external installation by the second connector 30. With this arrangement of the base element 28 rotated through 180°, the connection opening 54 of the second flow duct 34 connects to the outlet 16 of the heat exchanger. This second flow duct 34 produces a connection to the line connection or connection opening 58, which forms the outlet of the cooled heating medium. A line can be connected to this connection opening 58 and guides the heating medium back into the heat accumulator 4. In the embodiment shown in FIG. 2, in which, as will be described below, a circulation of the service water is simultaneously provided, a line 64 is connected to the connection opening 58 and leads to a switching valve 66, which selectively produces a connection of the line 64 to the connection points 68 and 70. The connection points 68 and 70 connect to the heat accumulator 4, wherein these connection points can produce, for example, a connection to the inside of the heat accumulator 4 at different vertical positions so that, depending on the temperature of the heating medium emergent from the heat exchanger 6, said heating medium can be fed back into the heat accumulator 4 at different vertical positions by switching the switching valve 66 so as to maintain a layered arrangement of the heating medium in the heat accumulator. In particular, the switching function is advantageous if, as described below, a service water circulation module 74 is provided. The heating of the circulated service water requires a lower heat demand and therefore the heating medium flows back into the heat accumulator 4 at a higher temperature.

The flow path 32 inside the base element is connected at the second connector 30 to the inlet 18 by means of the connection opening 36. A cold water line 42 for feeding the cold service water is connected to the connection opening 38. The cold water enters the inlet 18 through this line and enters the heat exchanger.

Figure 5:
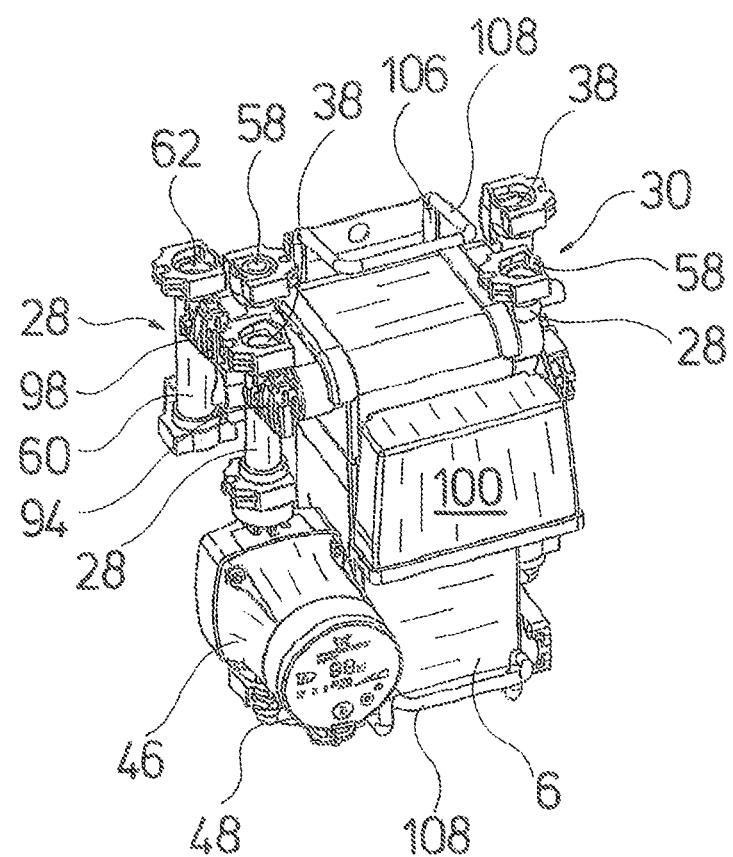
Figure 6:
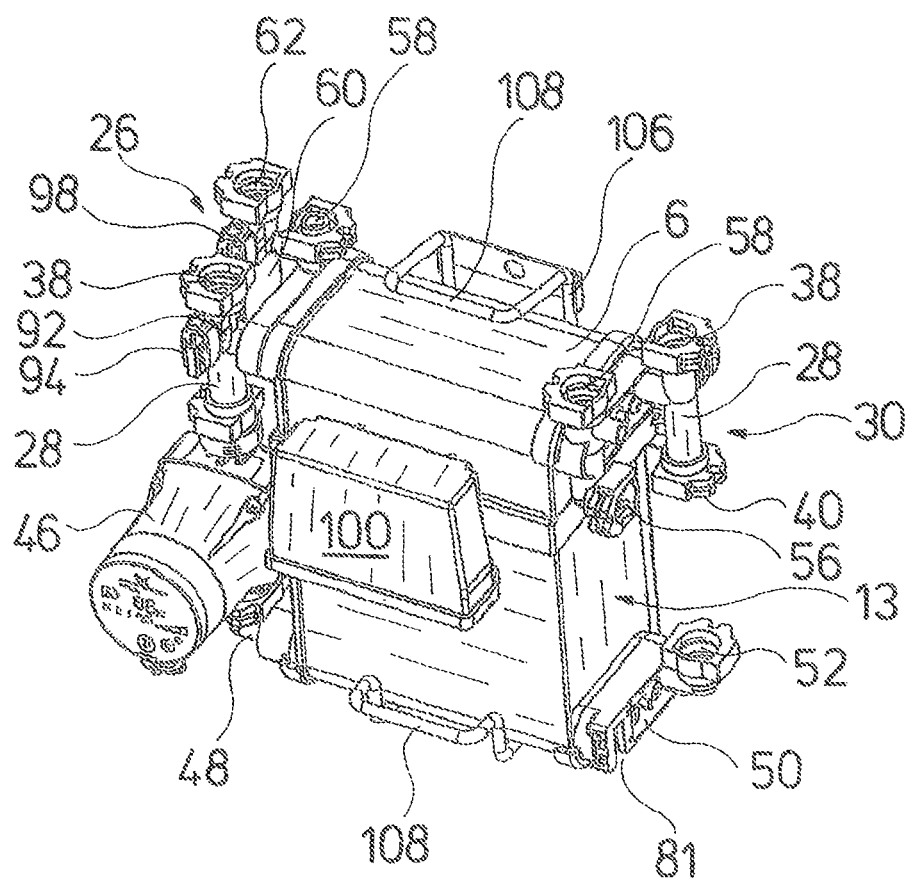
Figure 7:
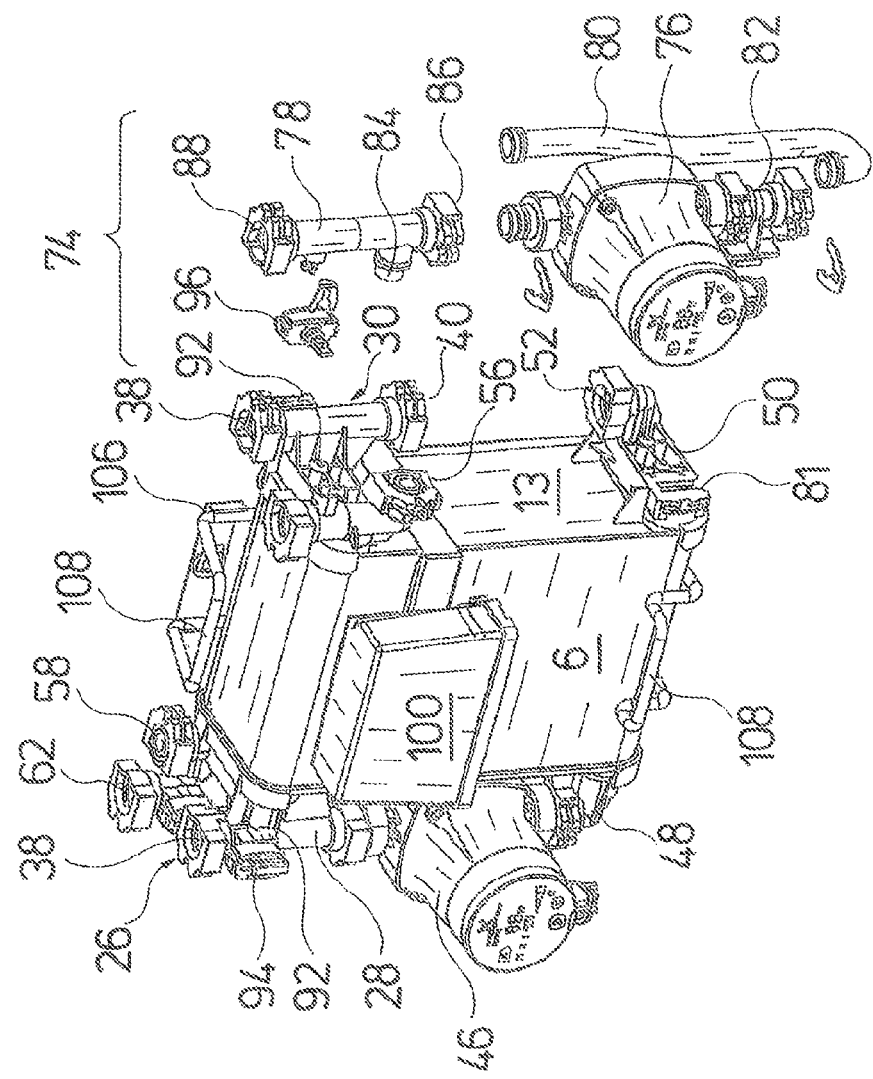
FIG. 7 shows a perspective exploded view of the service water heating unit with a service water circulation module.
Figure 8:
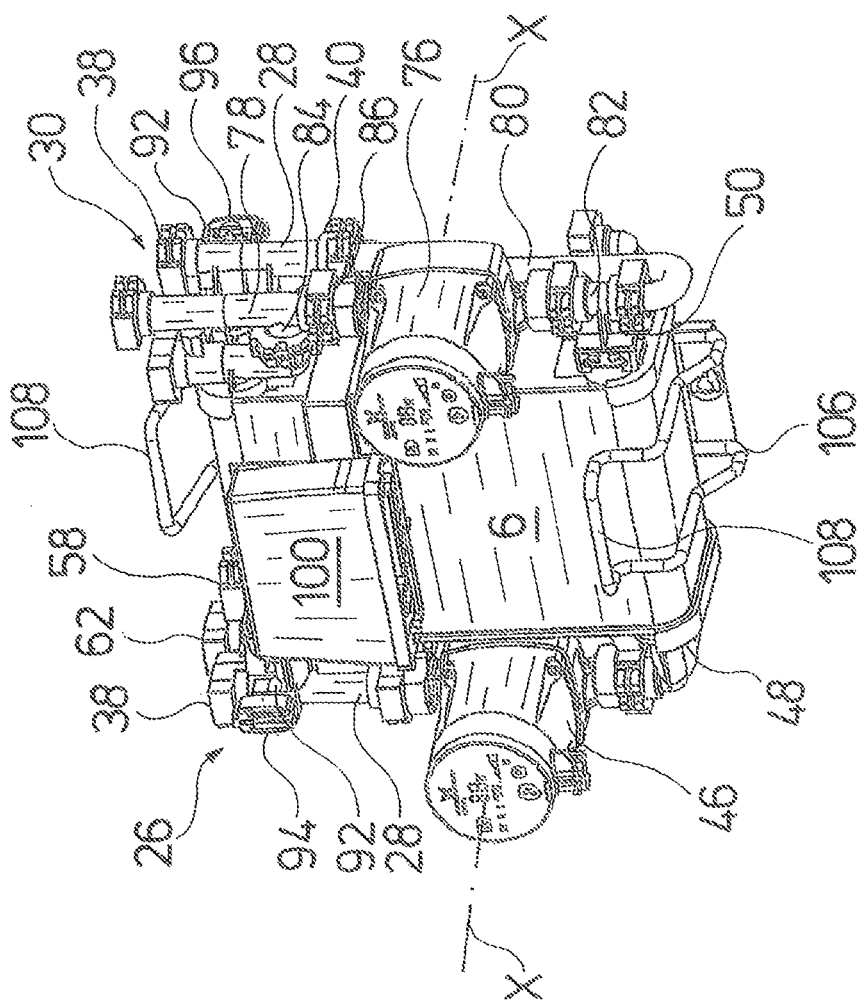
FIG. 8 shows a perspective view of the service water heating unit with an assembled service water circulation module.

The service water heating unit shown here can be used in two different embodiments, namely with a service water circulation module 74 or else without said service water circulation module 74. In FIGS. 1, 2, 4, 7 and 8 this service water circulation module 74 is arranged on the heat exchanger 6. FIGS. 5 and 6 show the arrangement without the service water circulation module 74. If the service water circulation module 74 is not provided, the fourth connector 50 is not necessary and the connection opening or line connection 40 of the base element 28 of the second connector 30 is closed by a stopper. In this case, the connection opening 56 of the flow duct 34 is closed by a stopper.

The service water circulation module 74 consists of a second circulating pump 76, which circulates the service water in the hot water line system of a building. A connection part 78 and a pipe 80 are provided for connection of the second circulating pump 76. In order to mount the pump 76 on the heat exchanger 6, a fourth connector 50, for this purpose, is arranged on the end of a side face and is identical to the third connector 48 or comprises an identical base element. However, when used as a fourth connector 50, the flow duct 52 is redundant. A seat 81 is formed in the base element of the third and fourth connectors, into which seat a connection element 82 is inserted which is connected to a pressure connection of the circulating pump 76. The connection element 82 comprises, internally, a flow duct and thus produces a connection to the pipe 80. The pipe 80 is connected at its end remote from the connection element 82 to the connection opening 40 of the flow duct 32 in the second connector 30, the connection opening 40 then not being closed by a stopper. The circulating pump 46 serving as a circulation pump can thus guide some of the heated service water back into the flow duct 32 of the second connector 30 and, through the connection opening 36 thereof, into the inlet 18 of the heat exchanger. This means, fed cold service water flowing through the connection opening 38 and service water fed back by the circulation pump 76 through the connection opening 40 flow together in the flow duct 32 of the second connector.

The connection part 48 is placed on the base element 28 of the second connector 30 in such a way that it engages in the connection opening 56 of the second flow duct 34 by a closed connecting piece 84 and thus closes the connection opening 56 in such a way that an additional stopper is no longer necessary to close said connection opening in the second connector 30. For the rest, the connection part 78 is tubular and connects two connection openings 86 and 88 located at opposite ends. The connecting piece 84 does not comprise a fluid connection to the connection between the line connections and connection openings 86 and 88. The connection opening 86 is connected to the intake connection of the second circulating pump 76 and the connection opening 88 forms a connection point to which a circulation line 90 is connected. By using the connection part 78 and a fourth connector 50, of which the base element is identical to the third connector 48, a second circulating pump 76, which constitutes a circulation pump, can likewise thus be fastened, with few additional parts, to the heat exchanger 6 serving as a bearing structure, and the circulation line can be directly connected, in fluid communication, to the second flow path 12 inside the heat exchanger via the circulating pump 46.

A sensor holder 92 is formed in the flow duct 32 in the base element 28 of the first and second connectors 26 and 30 and can be used to accommodate a sensor. When the base element 28 is used as a second connector 30, the sensor holder 92 is closed if no service water circulation module 74 is assembled. A temperature sensor 94 is placed in the sensor holder 92 in the first connector 26 and detects the temperature of the heating medium fed to the heat exchanger 6. With use of the service water circulation module 74, a temperature sensor 96 is also placed in the sensor holder 92 of the base element 28 of the second connector 30 and detects a service water demand, the specific functioning of this temperature sensor being described below. Furthermore, the connection part 60 also comprises a sensor holder in which a sensor 98 is placed. The sensor 98 is a combined temperature and flow sensor which detects the temperature and flow rate of the heated service water emergent from the outlet 20 from the heat exchanger 6 via the flow path 34 in the first connector 26. It is to be understood that the temperature sensors 94, 96 described above could also be used as combined temperature and flow rate sensors if necessary.

Owing to the sensor 98, the temperature of the emergent service water can be detected and, based on this temperature and on the temperature of the heating medium detected by the temperature sensor 94, the necessary volume flow rate of the heating medium can be determined and the first circulating pump 46 can be operated accordingly. The control or regulator for the circulating pump 46 necessary for this is preferably integrated into the circulating pump 46 as regulating or control electronics.

Figure 13:
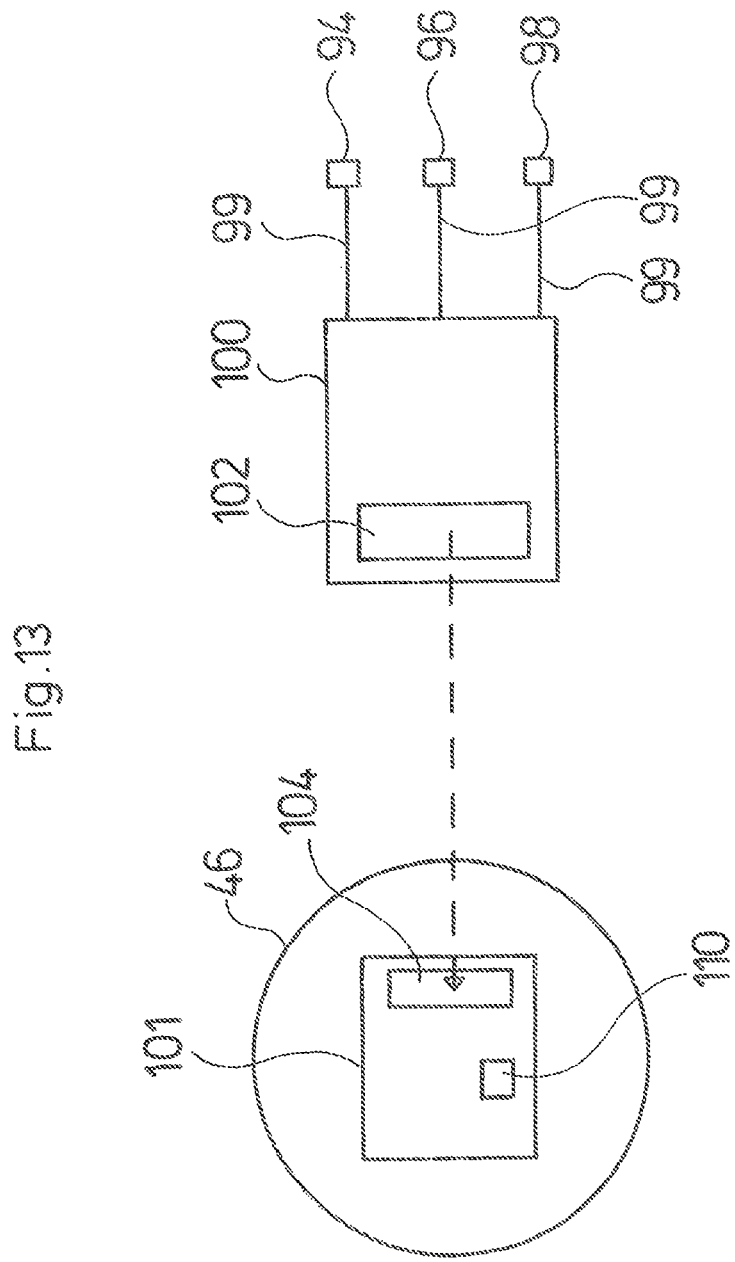
FIG. 13 shows a schematic view of the data transfer from the sensors to a control device.

The sensors 94, 96 and 98 are connected via electrical lines 99 to a sensor box 100 which forms a data detection module. The sensor box 100 detects the data provided by the sensors 94, 96 and 98. As shown in FIG. 13, the sensor box 100 makes available the detected data of the control unit 101, which is integrated in this example into the control electronics of the pump unit 46. For this purpose an output interface 102 is provided in the sensor box 100 and a corresponding input interface 104 is provided in the control unit 101. The output interface 102 and the input interface 104 are formed, in this instance, as air interfaces which enable a wireless signal transmission from the sensor box 100 to the control unit 101 in the pump unit 46. This enables a very simple connection of the pump unit 46 and also of the sensors 94, 96 and 98, since these do not have to be connected directly to the pump unit 46. The sensors 94, 96 and 98 can thus be connected and wired independently of the circulating pump 46, and the circulating pump 46 can also be easily replaced, if necessary, without interfering with the wiring of the sensors. The control unit 101 in the circulating pump 46 preferably controls and regulates not only the circulating pump 46, but also the circulating pump 76, for which purpose the control unit 101 in the circulating pump 46 can communicate, preferably likewise wirelessly via radio, with the circulating pump 76 and the control device thereof. Both circulating pumps 46 and 76 can thus be connected very easily since only one electric connection is necessary for the mains power supply. The control communicates in a completely wireless manner.

Signal conditioning of the signals supplied by the sensors 94, 96 and 98 may also take place in the data detection module 100 or the sensor box 100 in order to provide the necessary data to the control device 101 in a predetermined format. The control unit 101 preferably reads from the output interface 102, via the input interface 104, only the data currently required for the control and therefore the data communication can be confined to a minimum.

The control unit 101 preferably also controls the circulation effected by the circulating pump 76 with use of the service water circulation module 74, in such a way that the circulating pump 76 is switched off for circulation when the temperature sensor 94 detects a temperature of the heating medium fed from the heat accumulator 4 which lies below a predetermined threshold value. The heat accumulator 4 can thus be prevented from cooling excessively owing to the service water circulation, and the circulation can instead be interrupted at times at which the heat supply to the heat accumulator 4 is too low, for example owing to a lack of solar irradiation on a solar module.

The control unit 101 controls the operation of the circulating pump 46 in such a way that the circulating pump 46 is first switched on when a heat demand for heating the service water is given, such that heating medium is fed from the heat accumulator 4 to the heat exchanger 6. If no service water circulation module 74 is provided, this heat demand for the service water is detected via the combined temperature/flow rate sensor 98. If this sensor detects a flow in the flow path through the connection part 60, i.e. a flow of service water, this means that a tap point for hot service water is open, such that cold service water flows in through the connection opening 38 and a heat demand for heating the service water is given. The control unit 101 can thus start up the circulating pump 46 in this case.

If the service water circulation module 74 is provided, the service water demand cannot be detected since the sensor 98, also owing to the circulation effected by the second circulating pump 76, detects a flow when no tap point for service water is open. In this case merely the temperature of the service water emergent from the heat exchanger 6 can be detected by the sensor 98 and, if this is below a predetermined threshold value, the circulating pump 46 can be switched on in order to compensate for the heat losses caused by circulation, in such a way that heating medium is fed to the heat exchanger 6 and the circulated service water is thus heated.

Figure 11:
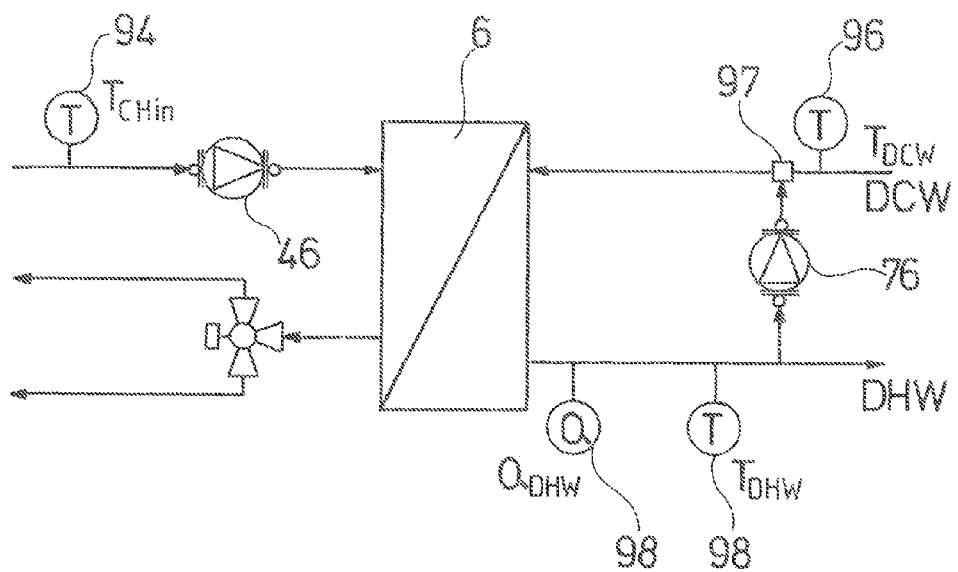
FIG. 11 shows a hydraulic circuit diagram of a service water heating unit.
Figure 12:
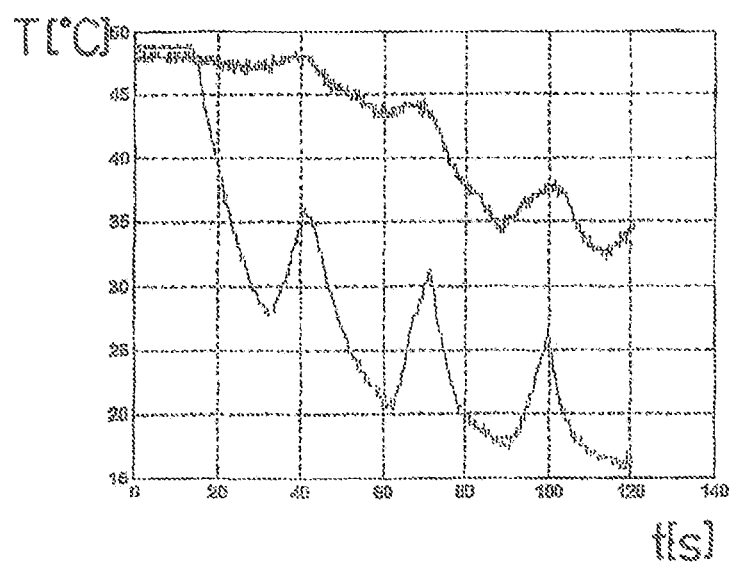
FIG. 12 shows the temperature curve which is detected by a temperature sensor in the cold water inlet of the service water heating unit.

In this case the temperature sensor 96 is used in order to detect a service water demand owing to the opening of a tap point 7. As illustrated schematically in FIG. 11, this temperature sensor is not arranged precisely at the junction of the flow duct 32 in the base element 28 into which the portions of the flow duct from the connection openings 36 and 38 and 40 merge, but instead is offset from this junction towards the connection opening 38. This means, the temperature sensor 96 is located in the portion of the flow duct through which the cold service water is fed. If a tap point for heated service water is opened, this leads to a flow of cold service water in this line portion, such that a decrease in temperature is detected, as can be seen in the lower curve in FIG. 12, by the sensor 96 in the portion of the first flow duct 32, which runs to the connection opening 38. When such a decrease in temperature is detected, the control unit 101 switches on the circulating pump 46 for the supply of heating medium. A plurality of successive service water requests are illustrated in FIG. 12, which each lead again to a decrease in temperature and, once the request for heated service water is over, lead again to a rise in temperature since the water in the line portion in which the temperature sensor 96 is arranged is heated again.

In the second connector 30 the temperature sensor 96 is arranged slightly above the junction where the flow paths or portions of the flow duct 32 from the connection openings 36, 38 and 40 meet. It is thus ensured that the water in the line portion in which the sensor 96 is located is slowly heated again, when the tap point for service water is closed and there is thus no flow, by heat transfer by the service water circulated by the circulating pump 46 so as to flow from the connection opening 40 to the inlet 16.

As already described above, the heat exchanger 6 forms the bearing element of the service water heating unit 2, on which the connectors 26, 30, 48 and optionally 50 are fastened to the pumps 46 and optionally 76 and to the sensor box 100. The service water heating unit 2 thus forms an integrated module which can be incorporated as a prefabricated unit into a heating installation or into a heating system. The circulating pumps 46 and 76 are arranged relative to the heat exchanger 6 in such a way that their axes of rotation X extend parallel to the surfaces of the plates, in particular the outer plates 13. A holding device in the form of a clip 106 is mounted on the heat exchanger 6 in order to in turn fasten the heat exchanger 6 with the components mounted thereon to the heat accumulator 4 or to another element of a heating installation. The clip 106 forms a fastening device for fastening to the heat accumulator 4 and further forms handle elements 108 at which the entire service water heating unit 2 can be gripped, it thus being possible to handle the entire unit in a simple manner during assembly.

Figure 14:
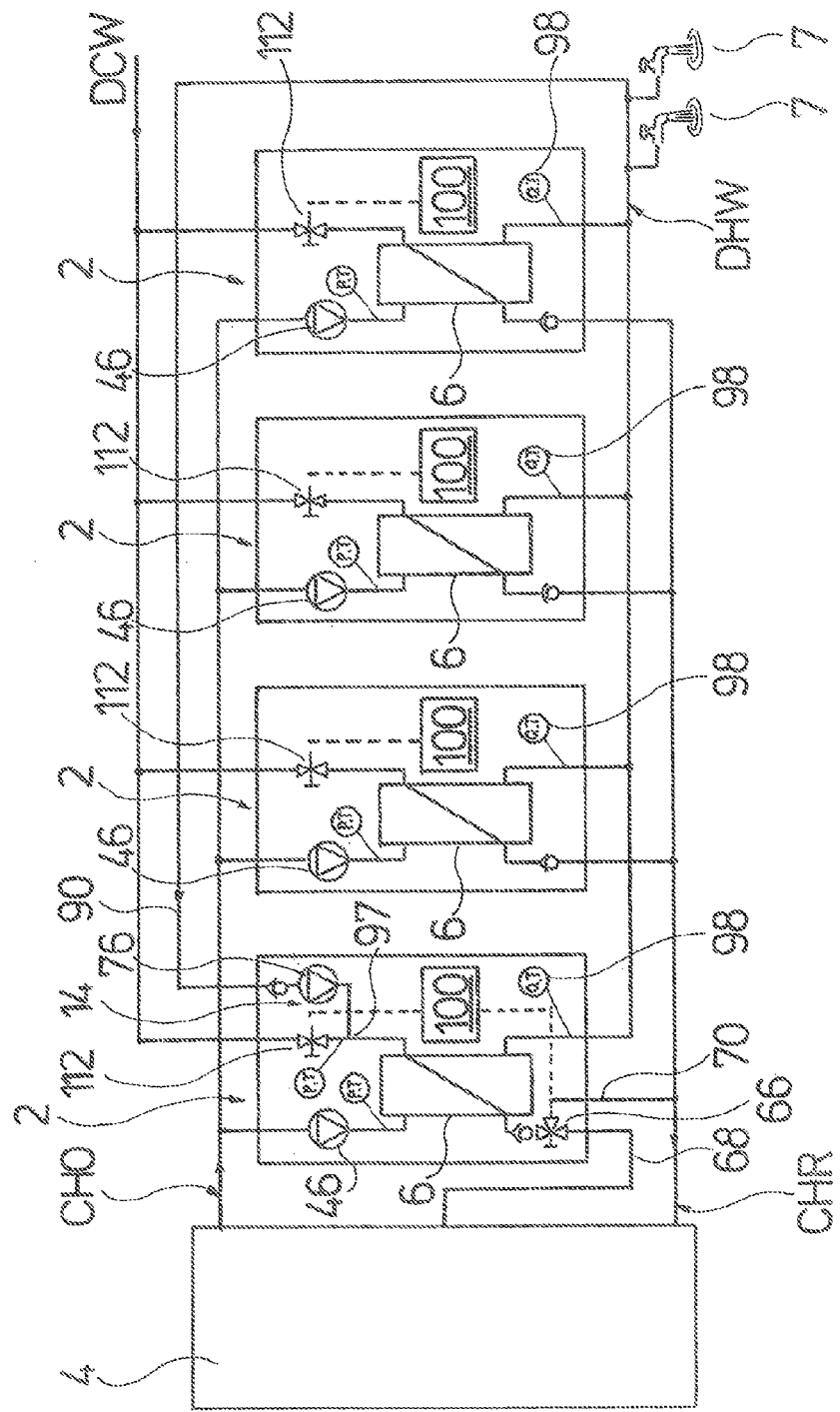
FIG. 14 shows the arrangement of a plurality of service water heating units 2 in a cascade arrangement.

FIG. 14 shows a specific arrangement of service water heating units 2. In this arrangement four service water heating units 2 according to the description above are connected in parallel in a cascade-like manner in order to satisfy a greater service water demand. In the example illustrated, four service water heating units 2 are shown. However, it is to be understood that fewer or more service water heating units 2 can also be arranged accordingly depending on the maximum service water demand. In the example shown all service water heating units 2 are supplied with heating medium from a common heat accumulator 4. The service water heating units 2 are identical, except for one. The first service water heating unit 2, the one which is arranged beside the heat accumulator 4 in FIG. 14, is formed according to the design which is shown in FIGS. 1, 2, 4, 7, 8 and 11, i.e. this first service water heating unit 2 comprises a service water circulation module 74. The service water circulation module 74, which comprises the second circulating pump 46, is connected to the circulation line 90. This connects, at the tap point 7 located farthest away, to the line for heated service water DHW. Heated service water can thus be circulated through the entire line system, which supplies the tap points 7 with heated service water. The functioning of this service water heating unit 2 comprising a service water circulation module 74 basically corresponds to the description above. The three other service water heating units 2 are formed without a service water circulation module 74, i.e. as shown in FIG. 5.

Each of the service water heating units 2 according to FIG. 14 comprises a control unit 101 integrated into the circulating pump 46 and a separate sensor box 100. The individual control units 101 of the plurality of service water heating modules 2 communicate with one another via air interfaces 110 (see FIG. 13). In the first service water heating unit 2 the air interface 110 can also be used for communication with the second circulating pump 76 and optionally with the switching valve 66. However, it is also possible for the switching valve 66 to be controlled via the sensor box 100 and, for this purpose, is connected to the sensor box 100 via an electric connection line.

The control units 101 of all service water heating units 2 are formed identically and together control the cascade arrangement, as will now be described in greater detail with reference to FIG. 15.

Figure 15:
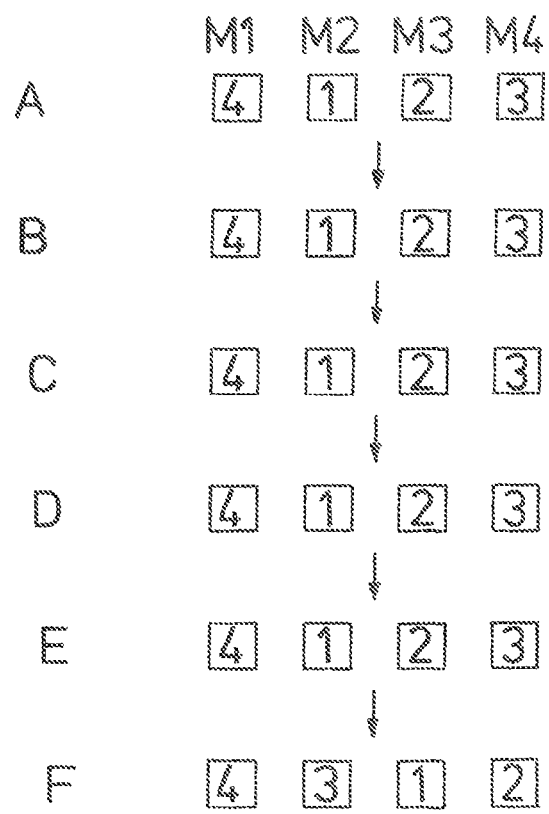
FIG. 15 shows a schematic view of the control of the plurality of service water heating units according to FIG. 14.

In FIG. 15 the four service water heating units 2 are denoted as M1, M2, M3 and M4. In the small boxes arranged beneath, the numbers 1 to 4 denote the starting sequence of the service water heating units 2. The service water heating unit 2 which has position 1 in the starting sequence (in the first step M2) adopts a management function, i.e. is the managing service water heating unit 2, i.e. of which the control unit 101 also allows the further service water heating units 2 to be switched on and off.

If there is a service water request, i.e. one of the tap points 7 is opened, this is detected in the managing service water heating unit 2, as described above, by the combined temperature/flow rate sensor 98. The service water heating units 2 denoted by M2 to M4 are the service water heating units 2 shown in FIG. 14 without a service water circulation module 74. The service water heating unit 2 comprising the service water circulation module 74 is the module denoted in FIG. 15 by M1. This never adopts a managing function. If the managing module M2 now detects a service water request in step A, this service water heating unit 2 is started up first, i.e. the circulating pump 46 feeds heating medium to the associated heat exchanger 6. If the service water request is now switched off from steps B to C, this managing service water heating unit 2 is still heated in step C. If there is now a new service water request from steps C to D as a result of the opening of a tap point 7, this managing service water heating unit 2 (M2) is thus started up again. If the service water demand now increases, for example by the opening of a further tap point 7, a next service water heating unit 2 is switched on in step E in that the control unit 101 of the managing service water heating unit 2 (M2) of the service water heating unit 2 in the second position in the starting sequence (in this case M3) sends a signal for start-up. Its control unit 101 then accordingly starts up the circulating pump 46 of this further service water heating unit 2 (M3) in order to supply the heat exchanger 6 thereof with heating medium.

If the service water request is again stopped from step E to step F, the service water heating unit 2 is switched off and the control units 101 of the individual service water heating units 2 again determine the starting sequence among themselves. This occurs in that the service water heating unit 2 which was switched on last now adopts the first position in the starting sequence, and the service water heating unit 2 which was switched on first, i.e. the previously managing service water heating unit 2, returns to the last position (in this case M2). The managing function also changes accordingly to the service water heating unit 2 which is now in the first position in the starting sequence (M2). A uniform utilisation of the service water heating units 2 is thus ensured and the service water heating unit 2 which is started up first is simultaneously preferably a service water heating unit 2 which still contains residual heat. The service water heating unit 2 comprising the service water circulation module 74 always maintains the last position in the starting sequence, i.e. it is only switched on with maximum load and, for the rest, merely heats circulated service water. Should a service water heating unit 2 be faulty or fail, it is removed completely from the starting sequence, i.e. it is no longer started up at all. All this occurs by communication of the identical control units 101 with one another, and therefore a central control can be omitted.

A valve 112, which is not described above with reference to FIGS. 1 to 13, is additionally arranged in the inlet line for cold service water DCW of each service water heating unit 2 in order to switch off the service water heating units 2 when they are not heating service water. This valve 112 is controlled by the control unit via the sensor box 100. The valve 112 is preferably connected via an electrical connection line to the sensor box 100 and the control unit 101 sends a signal to the sensor box 100, via the input interface 104 and the output interface 102, to open and close the valve 112. If the valve 112 is closed, no service water flows through the respective heat exchanger 6, such that cold service water is prevented from flowing through the heat exchanger 6 of the unused service water heating units 2 into the outlet line for heated service water DHW.

Figure 16:
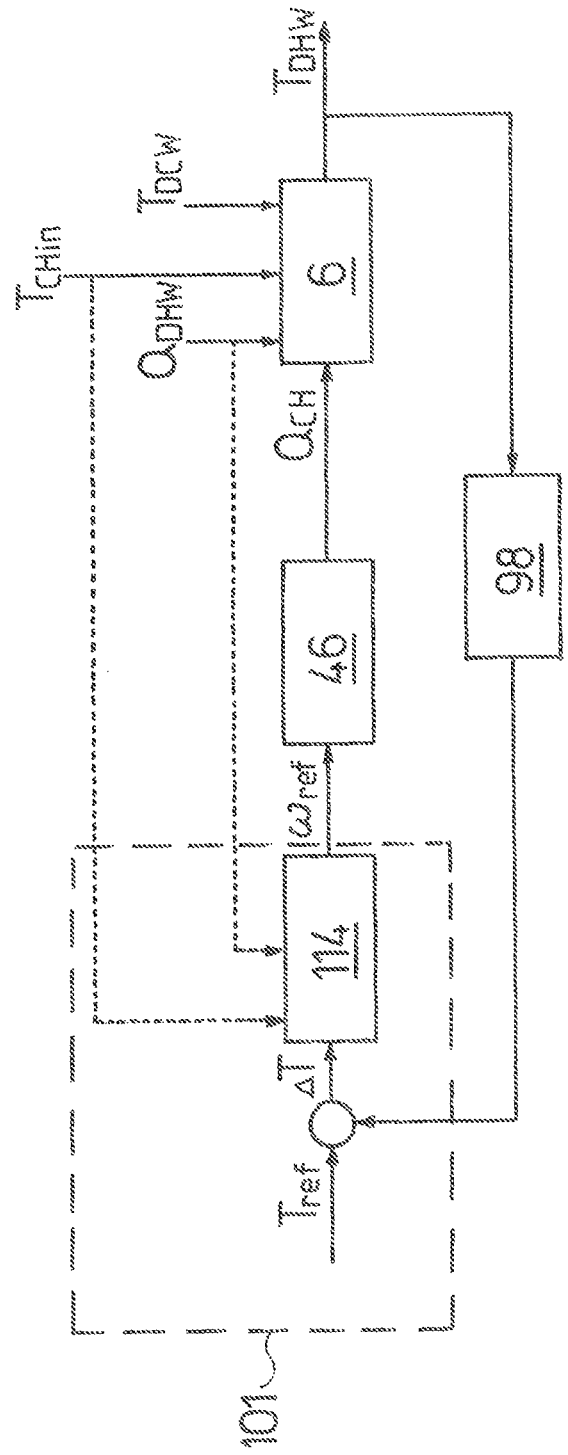
FIG. 16 shows a schematic view of a control circuit for controlling the service water heating units.

The temperature control of the heated service water DHW in a service water heating unit 2 according to the above description will now be described with reference to FIG. 16. A regulator 114 is arranged in the control unit 101 and a setpoint temperature $T_{ref}$ for the heated service water DHW is predetermined for this regulator. For example, this setpoint temperature can be adjusted at the control unit 101 in the circulating pump 46. For this purpose control elements may be provided on the circulating pump 46. Alternatively, an adjustment may also be made via a wireless interface, for example infrared or radio, by means of remote operation or via system automation. The actual temperature $T_{DHW}$ of the heated service water DHW detected by the sensor 98 is subtracted from the setpoint value $T_{ref}$. The difference is fed to the regulator 114 as an error $\Delta T$. This outputs a setpoint speed $\omega_{ref}$ for the circulating pump 76, at which the circulating pump 46 is controlled, such that it feeds a volume flow $Q_{CH}$ of heating medium to the heat exchanger 6. The incoming cold service water DCW is then heated in this heat exchanger 6, such that it has the output temperature $T_{DHW}$ on the outlet side of the heat exchanger 6. This actual value $T_{DHW}$ is then, as described, detected by the sensor 98 and again fed to the regulator. This means, in accordance with the invention the speed of the circulating pump 46 and therefore the volume flow $Q_{CH}$ of the heating medium is controlled as a function of the output temperature of the hot service water DHW.

In this example, a disturbance variable feedforward is further provided in the regulator 114 in order to achieve a rapid response characteristic. For this purpose, the volume flow rate of the service water is also detected by the sensor 98 and this service water volume flow rate $Q_{DHW}$ is sent to the regulator 114 as a disturbance variable. Furthermore, the temperature $T_{CHin}$ of the heating medium fed to the heat exchanger 6 by the circulating pump 46 is detected by the temperature sensor 94 and is sent to the regulator 114 as a disturbance variable. Taking into account this disturbance variable, the setpoint speed $\omega_{ref}$ of the circulating pump 46 is accordingly adjusted, such that even the speed of the circulating pump 46 can be increased, for example with cooler heating medium and/or greater service water volume flow rate, in order to reach more quickly the required setpoint temperature $T_{ref}$ for the service water to be heated. A further disturbance variable or a further parameter which affects the service water temperature $T_{DHW}$ is the temperature $T_{DCW}$ of the incoming cold service water DCW. In the example shown, however, this is not sent to the regulator 114 as a disturbance variable, since the cold water temperature is generally basically constant. However, if the cold water temperature is subjected to considerable fluctuations, it would be conceivable to also send the temperature $T_{DCW}$ to the regulator 114 as a disturbance variable.

LIST OF REFERENCE NUMERALS

2—service water heating unit
4—heat accumulator
6—heat exchanger
7—tap point
8—housing
10—first flow path for the heating medium
12—second flow path for the service water
13—outer plates
14—inlet
16—outlet
18—inlet
20—outlet
22—temperature curve of the heating medium
24—temperature curve of the service water
26—first connector
28—base element
30—second connector
32, 34—flow ducts
36, 38, 40—connection openings or line connections
42—seals
44—feed line
46—first circulating pump
48—third connector
50—fourth connector
52—flow duct
54, 56, 58—connection openings or line connections
60—connection part
62—line connection
64—line
66—switching valve
68, 70—connection points
72—cold water line
74—service water circulation module
76—second circulating pump
78—connection part
80—pipe
81—seat
82—connection element
84—connecting piece
86, 88—connection openings
90—circulation line
92—sensor holder
94, 96—temperature sensors
97—junction
98—sensor
99—lines
100—sensor box
101—control unit or control and regulation electronics
102—output interface 104—input interface
106—clip
108—handle
110—radio interface
112—valve
DCW—cold service water
DHW—hot service water
CHO—hot heating medium, heating medium feed
CHR—cold heating medium, heating medium return
$T_{ref}$—setpoint temperature
$T_{DHW}$—temperature of the heated service water
$T_{DCW}$—temperature of the cold service water
$T_{CHin}$—temperature of the heating medium
$Q_{DHW}$—service water volume flow rate
$Q_{CH}$—heating medium volume flow rate
$\Delta T$—error
$\omega_{ref}$—setpoint speed

The invention claimed is:

1. A service water heating unit (2), forming a prefabricated unit containing all necessary components for service water heating, for integration into heating installation, the service water heating unit (2), comprising:

at least one plate heat exchanger (6); and a circulating pump (46), mechanically connected to the at least one plate heat exchanger (6), that conveys water as a heating medium to the at least one plate heat exchanger (6), the at least one plate heat exchanger (6) comprising:

a service water inlet (18) and a service water outlet (20) for the service water to be heated and a heating medium inlet (14) and a heating medium outlet (16) for the heating medium, a first flow path (10), connected to the circulating pump (46), in which water as a heating medium flows and a second flow path (12) connected to the service water inlet in which service water to be heated flows, wherein the at least one plate heat exchanger (6) is divided into a plurality of portions, the plurality of portions comprising:

a first portion (A), a majority of an entire length of the first flow path (10) and a majority of an entire length of the second flow path (12) contained within the first portion (A) passing by one another in opposite directions in a countercurrent arrangement, and a second portion (B), connecting downstream when viewed in the direction of flow of the service water, a majority of an entire length of the first flow path (10) and a majority of an entire length of the second flow path (12) contained within the second portion (B) running parallel to each other in the same direction in a co-current arrangement such that an outlet of the second flow path (12) is not located in a hottest region of the at least one plate heat exchanger (6).

2. The service water heating unit (2) according to claim 1, wherein the first portion (A) has a length ranging between 50% and 80% of the length of the second flow path.

3. The service water heating unit (2) according to claim 1, wherein the service water heating unit comprises at least two interconnected heat exchangers, each heat exchanger including the first portion (A) and the second portion (B).

4. The service water heating unit (2) according to claim 1, wherein the plurality of portions further comprises a reverse portion (C) formed between the first portion (A) and the second portion (B), in which the first (10) path and/or the second flow path (12) reverses in a direction relative to the respective other flow path (10, 12).

5. The service water heating unit (2) according to claim 1, wherein the at least one plate heat exchanger (6) further comprises a connector (26), at least on the inlet or the outlet of the first flow path (10) and/or the second flow path (12) which connects to a connection line.

6. The service water heating unit (2) according to claim 5, wherein a temperature or flow rate sensor (98) is arranged in the connector (26).

7. The service water heating unit (2) according to claim 5, wherein the connector (26) is connected to the circulating pump (46).

8. The service water heating unit (2) according to claim 1, further comprising fastening elements (106) for mounting of the service water heating unit (2) on a heating boiler or heat accumulator (4).

* * * * *